United States Patent [19]
Krebs et al.

[11] Patent Number: 5,261,534
[45] Date of Patent: Nov. 16, 1993

[54] CONTAINER FOR MULTIPLE LASER DISKS

[75] Inventors: Philip J. Krebs, New Haven; Roger K. Gleason, Stratford; William C. Lamson, Jr., Huntington; Jean B. Mauro, North Haven, all of Conn.

[73] Assignee: Laserkrib, Inc., New Haven, Conn.

[21] Appl. No.: 830,671

[22] Filed: Feb. 4, 1992

[51] Int. Cl.⁵ .................. B65D 85/30; B65D 85/57
[52] U.S. Cl. .................... 206/310; 206/311; 206/312
[58] Field of Search ............ 206/444, 307, 309, 310, 206/311, 312, 313, 232

[56] References Cited

U.S. PATENT DOCUMENTS

| | | | |
|---|---|---|---|
| 3,825,112 | 7/1974 | Schumaker et al. | 206/310 |
| 3,949,872 | 4/1976 | Paudras | 206/310 |
| 4,598,824 | 7/1986 | Long et al. | 206/310 |
| 4,640,413 | 2/1987 | Kaplan et al. | 206/232 |
| 4,694,957 | 9/1987 | Ackeret | 206/309 |
| 4,702,369 | 10/1987 | Philosophe | 206/312 |
| 4,708,239 | 11/1987 | Bourbon | 206/45.13 |
| 4,717,021 | 1/1988 | Ditzig | 206/387 |
| 4,724,957 | 2/1988 | Burgschweiger | 206/309 |
| 4,728,157 | 3/1988 | David | 312/12 |
| 4,749,081 | 6/1988 | Carlson | 206/309 |
| 4,753,347 | 6/1988 | Bellante et al. | 206/387 |
| 4,778,047 | 10/1988 | Lay | 206/44 |
| 4,819,799 | 4/1989 | Nomula et al. | 206/310 |
| 4,874,085 | 10/1989 | Grobecker et al. | 206/309 |
| 4,888,761 | 12/1989 | Ohta | 369/291 |
| 4,895,252 | 1/1990 | Nomula et al. | 206/310 |
| 4,903,829 | 2/1990 | Clemens | 206/310 |
| 4,905,217 | 2/1990 | King et al. | 369/291 |
| 4,928,825 | 5/1990 | Hehn | 206/387 |
| 4,964,510 | 10/1990 | Loyd | 206/306 |
| 4,993,552 | 2/1991 | Bugbey et al. | 206/444 |
| 5,101,971 | 4/1992 | Grobecker | 206/310 X |
| 5,135,106 | 8/1992 | Morrone | 206/310 |

Primary Examiner—Steven N. Meyers
Assistant Examiner—Jacob K. Ackun

[57] ABSTRACT

A container for two or more disks having a center hole, comprising compartments having gripping portions, support members, positioning members, and projecting members. The projecting members are of sufficient length to project into the opposing compartment and contact the disk contained in the opposing compartment in a non-information area of that disk. In other embodiments, the projecting members may contact opposing projecting members, or the floor, in the opposing compartment. The projecting members provide improved rigidity to the container and increase its resistance to compressive force. Also disclosed are finger-like gripping members having an angled projection or protuberance to retain the disk thereunder.

29 Claims, 4 Drawing Sheets

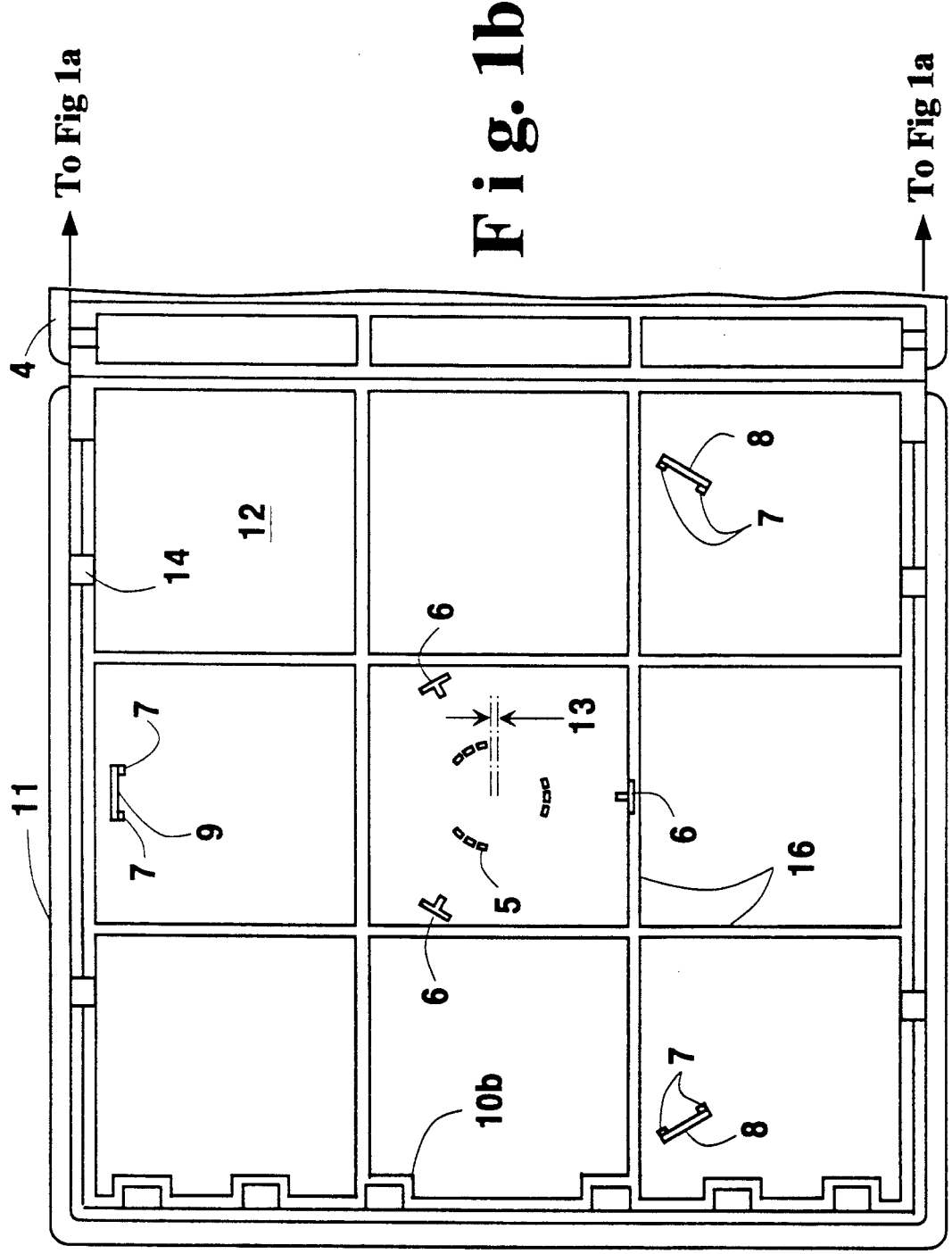

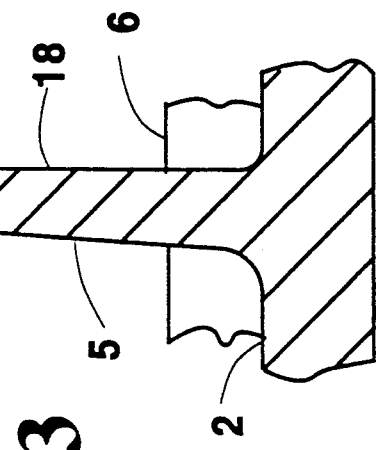
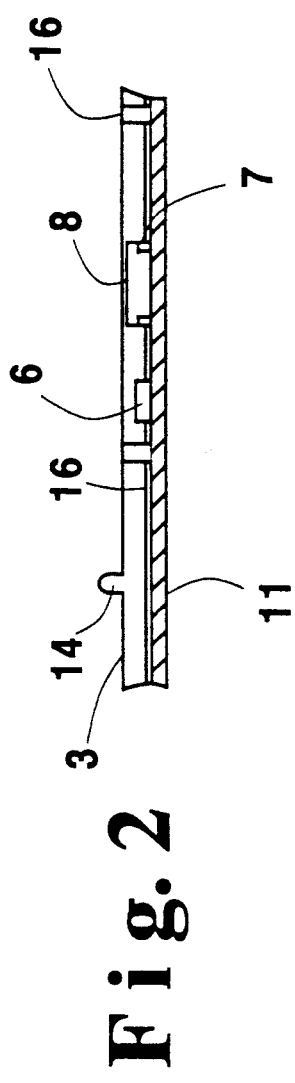
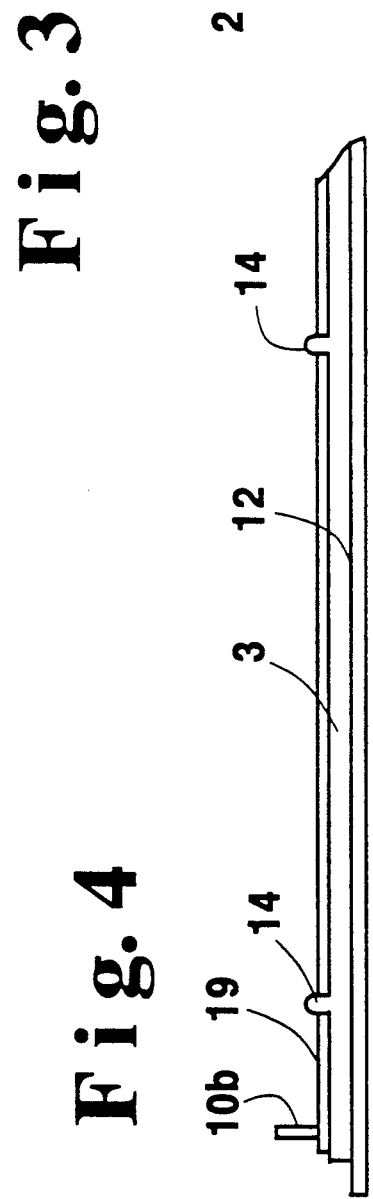
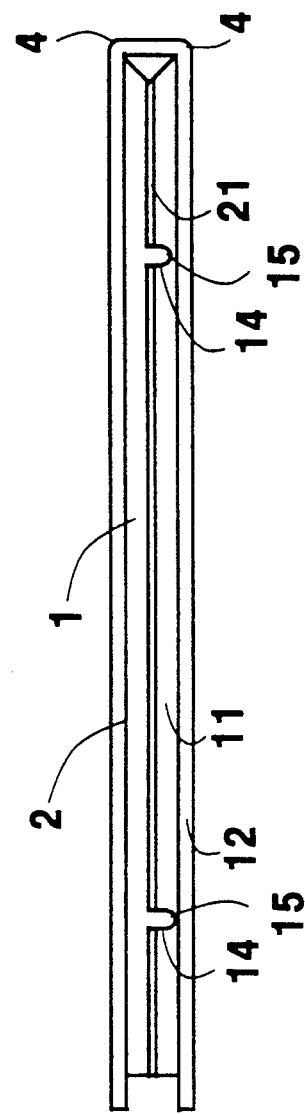

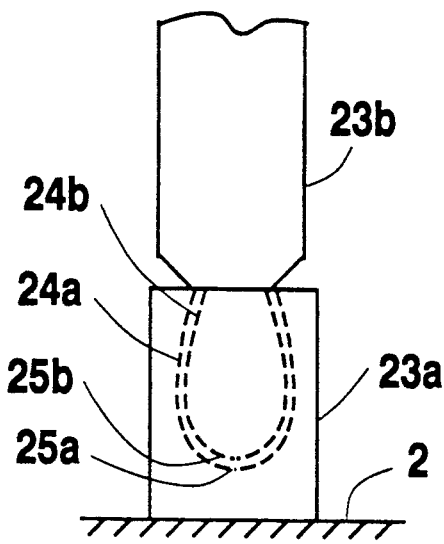
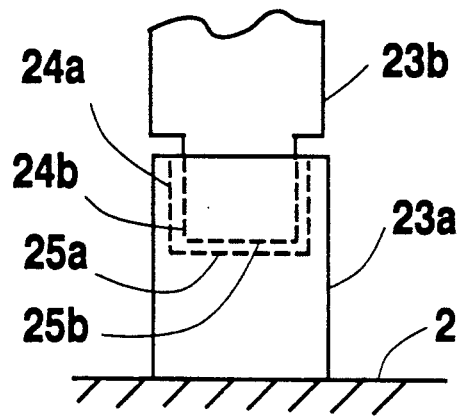
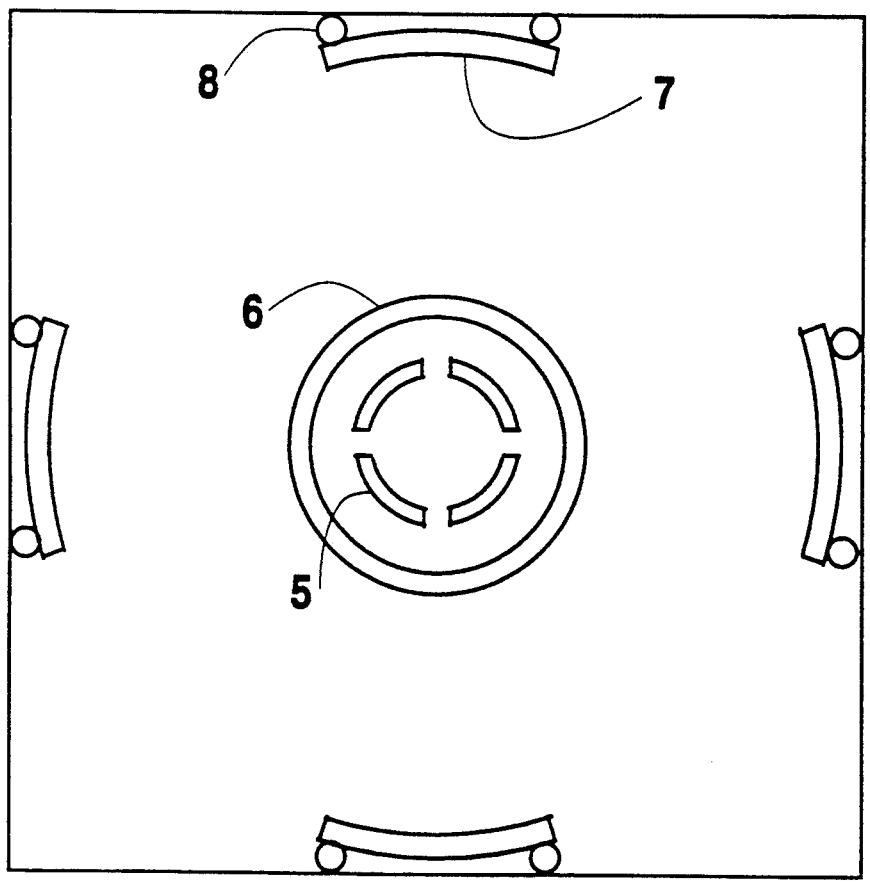

CONTAINER FOR MULTIPLE LASER DISKS

BACKGROUND OF THE INVENTION

1. Field of the Invention

This invention relates to an improved container for storage, portage, and display of laser disks or other disk-like media. In particular, this invention relates to such a container which, while useful for a single disk, is especially suitable for two or more disks. As used herein, the term "laser disk" is intended to include also the terms "optical disk," laserdisk," "laserdisc," and the like.

2. Description of the Prior Art

Disks containing optically recorded information are well known in the area of sound recording, i.e., compact disks, and in the area of storage of business records. More recently, large-format optical disks, the so-called laser disks, have begun to become very popular for recording video information for sale or rental to the general public. Disks of this nature are subject to warpage, and can be relatively difficult to handle, store and package in a protective way for rental purposes. The public demand for the rental of such disks is growing rapidly; however, prior to the instant invention, no fully satisfactory container was available to retail rental companies.

One container, known by the trademark "Fortress," consists of two round, slightly convex covers hinged together to form a compartment in which a single optical disk rests solely on a circumferential ledge in one of the covers. Since no other support is provided, the disk is not protected from warpage, and protection from external damaging forces is speculative. Moreover, since the disk is not retained by any gripping means, it will fall out if the container is accidentally opened, or is opened upside down.

Another type of container comprises a bulky, vacuum-molded book-like structure in which an optical disk is placed on one side and various printed materials are placed in sleeves on the other side. The disk side comprises an indented area of slightly greater diameter than a disk, and of slightly greater depth than the combined thickness of two disks. A disk is placed over a tapered hub of diameter slightly less than the diameter of the disk's center hole; the disk is pressed over, and retained by, edge ridges on the circumferential wall of the indented area. While it is physically possible to insert two disks on the one side, one on top of the other and theoretically separated by the retaining ridges, in actuality, the disks are found to be in intimate contact with each other, thereby causing substantial risk of damage to the recorded information on both disks. Further, once fully inserted, a disk is quite difficult to remove without a potentially damaging degree of bending. Moveover, this special-purpose package is too bulky for efficient shelf storage and is not even available to the video retail rental market. In addition, the vacuum molding process of manufacture, being relatively expensive, would make such packaging unaffordable to retailers.

The only other type of packaging available for laser disks is a sleeve assembly, either in plastic or paper or a combination of the two, virtually identical to the standard container for phonograph records. Such sleeves provide little or no protection from warpage or damage from external forces.

No device is presently available for packaging one or more laser disks in a simple, dependable, protective, cost-effective manner. The instant invention addresses these problems by providing a sturdy, relatively rigid container for one or more optical or other disks of similar type which is economical to manufacture and relatively thin in profile, so that it can conveniently be stored on the retail dealer's shelves, and will adequately protect the disks when in the hands of the renting public.

SUMMARY OF THE INVENTION

According to the present invention there is provided a multi-compartment, closable container for the storage, display and transport of one or more disks which have information recorded thereon, said information typically being readable by optical or magnetic means, said disks having a center hole surrounded by a label area, and an upper surface upon which information is recorded, and a lower surface upon which information is optionally recorded, said container comprising at least a first compartment and a second compartment of matching size and shape, both compartments comprising walls and a floor, said first compartment being hingedly connected to said second compartment and being of size and shape at least sufficient to contain a first said disk, said first compartment comprising:

(a) a floor section having walls projecting thereabove and defining a containment space for a said disk, one of said walls having one or more hinge members being connected to a corresponding wall of said second compartment, said walls being adapted to matingly engage the corresponding walls of said second compartment, (b) at least one latching member located on one or more walls other than the wall having said hinge member, each such latching member being adapted to latchingly engage a mating latching member on a corresponding portion of said second compartment, (c) a gripping portion within said containment space and comprising at least two, preferably three, flexible gripping members rising from said floor and spaced generally uniformly with respect to the circumference of the center hole of a said disk and adapted to grippingly engage the periphery of the said center hole of a first said disk when a first said disk is pressed onto said flexible members, (d) an inner support portion comprising at least one, and preferably a set of at least three, support elements raised with respect to said floor and arranged annularly with respect to the center hole of said first disk and dimensioned so as to supportingly contact the lower surface of said first disk when said first disk is grippingly engaged by said gripping portion, and located so as to contact said disk in its label area or optionally in an annular area between the label area and the annular area having recorded information, (e) an outer support portion comprising at least one, and preferably a set of at least three, support elements raised with respect to said floor and arranged circumferentially with respect to said first disk and located so as to supportingly contact the lower surface of said first disk beyond the outer extremity of said recorded information when said first disk is grippingly engaged by said gripping portion, (f) at least one positioning element raised with respect to said floor and arranged circumferentially with respect to said first disk and slightly beyond the periphery thereof to clear the periphery thereof and of sufficient height to extend above the lower surface of said first disk when said disk is in contact with said support portion, thereby cooperating with the gripping portion to position the disk within the containment area, (g) at least one projecting element raised with respect to said floor and located beyond the periphery of said first disk to clear the periphery thereof and of sufficient height to project into said second compartment and contact, or optionally to project sufficiently to contact under the influence of external force, between the outer extremity of the area of recorded information and the periphery, a disk held in said second compartment when the container is closed, said second compartment comprising:

(a) a floor section having walls projecting thereabove and defining a containment space for a said disk, said walls being adapted to matingly engage the corresponding walls of said first compartment, (b) at least one latching member located on one or more walls other than the wall having said hinge member, each such latching member being adapted to latchingly engage a mating latching member on a corresponding portion of said first compartment, (c) a gripping portion within said containment space and comprising at least two, preferably three, flexible gripping members rising from said floor and spaced generally uniformly with respect to the circumference of the center hole of a said disk and adapted to grippingly engage the said center hole of a second said disk when a second said disk is pressed onto said flexible members, said gripping portion being offset from the gripping portion of said first compartment, (d) an inner support portion comprising at least one, and preferably a set of at least three, support elements raised with respect to said floor and arranged annularly with respect to the center hole of said second disk and dimensioned so as to supportingly contact the lower surface of said second disk when said second disk is grippingly engaged by said gripping portion, and located so as to contact said disk in its label area or optionally in an annular area between the label area and the annular area having recorded information, (e) an outer support portion comprising at least one, and preferably a set of at least three, support elements raised with respect to said floor and arranged circumferentially with respect to said second disk and located so as to supportingly contact the lower surface of said second disk beyond the outer extremity of said recorded information when said second disk is grippingly engaged by said gripping portion, (f) at least one positioning element raised with respect to said floor and arranged circumferentially with respect to said second disk and slightly beyond the periphery thereof to clear the periphery thereof and of sufficient height to extend above the lower surface of said second disk when said disk is in contact with said support portion, thereby cooperating with the gripping portion to position the disk within the containment area, (g) at least one projecting element raised with respect to said floor and located beyond the periphery of said second disk to clear the periphery thereof and of sufficient height to project into said first compartment and contact, or optionally to project sufficiently to contact under the influence of external force, between the outer extremity of the area of recorded information and the periphery, a disk held in said first compartment when the container is closed, thereby providing a mutually supporting vertical relationship between the two disks and providing mutual support between the first and second compartments when the two compartments are closed onto each other and their corresponding walls are engaged, whereby the rigidity and resistance to compression of the entire container is increased.

According to the present invention there is also provided a container as described above, but wherein, either in addition to or as an alternative to part (g), there is provided at least one projecting element raised with respect to said floor and located beyond the periphery of said disk to clear the periphery thereof and of sufficient height to contact a corresponding projecting element or positioning element or the floor in the opposing compartment when the container is closed, thereby providing mutual support between the first and second compartments when the compartments are closed onto each other and their corresponding walls are engaged, whereby the rigidity of the entire container, and its resistance to external compressive force, is increased.

The present invention further provides gripping means for gripping and retaining a disk having a center hole by gripping and retaining the periphery of said center hole, comprising multiple, flexible, finger-like gripping members which project through said center hole when said disk is pressed onto said gripping members, said gripping members having a projection adapted to retain the periphery of said center hole thereunder.

The container of this invention is advantageously molded in one piece with a so-called "living" hinge, utilizing a suitable thermoplastic material, such as polyethylene or, preferably, polypropylene.

BRIEF DESCRIPTION OF THE DRAWINGS

FIGS. 1a and 1b show, collectively, a plan view of a preferred container of this invention having two compartments, one opposing the other, in the fully open position, ready to receive one or two disks. FIGS. 1a and 1b are referred to collectively as "FIG. 1."

FIG. 2 is an elevation view of a section of a compartment, showing an inner and an outer support member.

FIG. 3 is a profile view of a flexible gripping member.

FIG. 4 is an elevation view of a section of a compartment showing various structural features.

FIG. 5 is an elevation view of a two-compartment container in the fully closed position.

FIG. 6 is a plan view of an alternative embodiment of a compartment showing different possible configurations of various of the elements.

FIGS. 7a and 7b are elevation views of two possible post element configurations in the engaged position.

DETAILED DESCRIPTION OF THE INVENTION

Figure 1A:
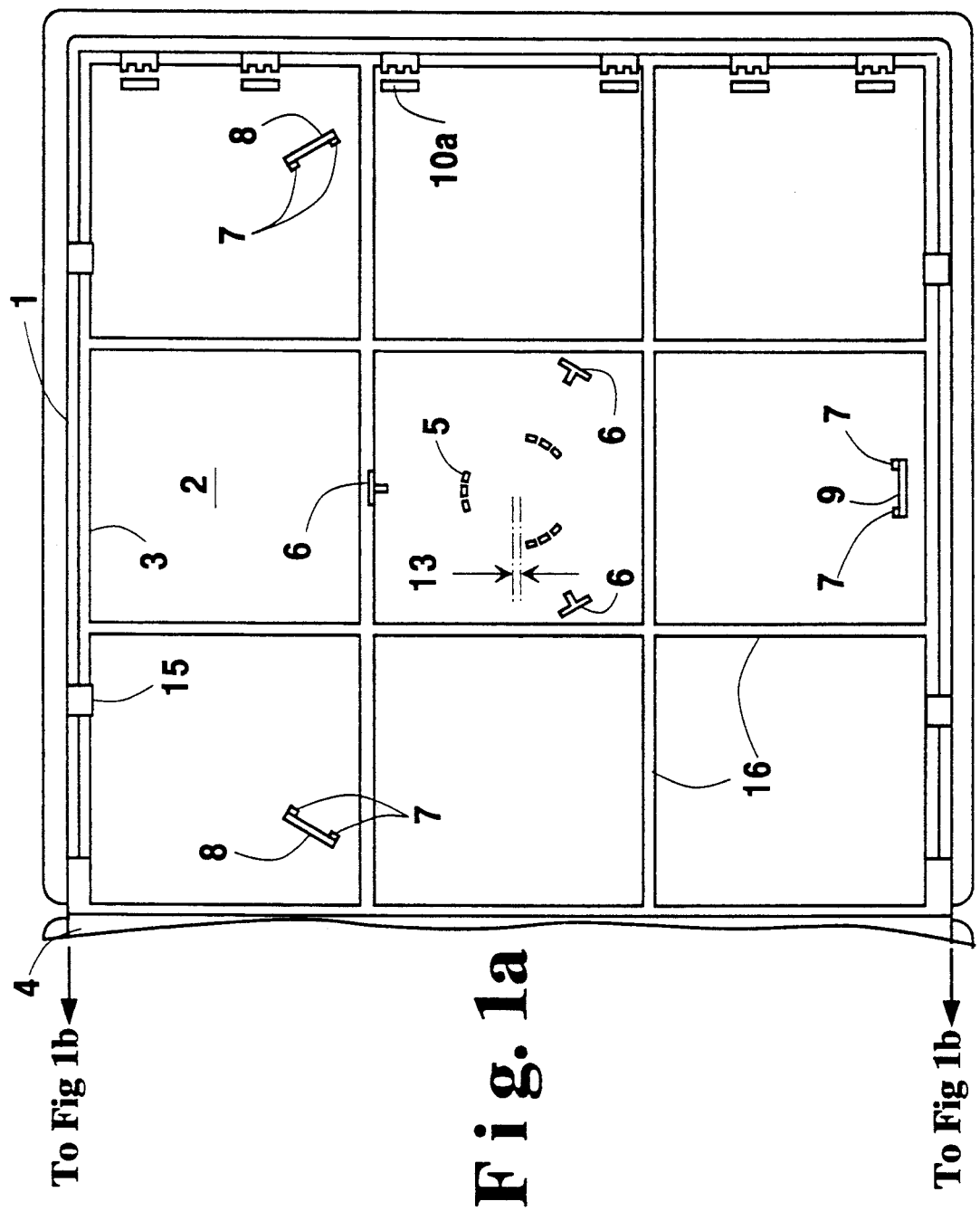

Referring to FIG. 1a, first compartment 1 is hingedly connected by hinge members 4 to second compartment 11. (As used herein, the terms "second" and "opposing" are used interchangeably.) Around the periphery of each compartment are walls 3, which define a containment space for each of two disks. Forming the base of each compartment are floors 2 and 12, respectively, surrounded by walls 3. The wall of the first compartment opposite the hinged area has attached to it a row of latch members 10a which correspond to a row of mating latch members 10b (see FIG. 1b) attached to the corresponding wall of the second compartment. It is preferred to utilize a series of individual latch members arrayed as shown. It will be understood, however, that fewer or more individual latch members could be used with good effect, and one or more additional or alternative latch members could be placed on one or more other walls. If, for example, the selected materials of construction (as will be discussed more fully below) of the container are such that the container is insufficiently rigid, or if inadequate bracing is used, it may be desirable to provide additional latching means on the side walls of the container to improve its overall rigidity. The use and selection of latching means is not considered critical to the invention, and is within the skill of the art to assist the overall purposes of the invention. In the preferred embodiment shown, the latch members are integral with the wall on which they are mounted; however, they could also be separately manufactured and added externally to the structure without departing from the scope and spirit of the invention.

It is preferred that the walls of the compartments be normal to their floors, as depicted in FIG. 1; however, it is not mandatory that they be so. If desired for aesthetic reasons, for instance, the walls could have a curved profile instead of a linear, vertical profile. It will be apparent, however, that a structure having non-vertical walls is likely to exhibit less rigidity and less resistance to external compressive force than the preferred embodiment shown.

Similarly, the walls shown in FIG. 1 are at the periphery of the compartments, but it is not mandatory that they be so positioned. For example, the walls could be somewhat within the outer boundaries of each compartment and yet be within the scope and spirit of the invention, if it were desired to apply other structural or decorative features to the container exterior to the walls. For purposes of this invention, it is only necessary that the walls serve their required purpose of defining a containment space for the disks and providing structural integrity to the container.

As will be readily appreciated, in a thin container of more than 12 inches in length and width, it is desirable to provide some type of cross-bracing to enhance the stiffness of the structure. In the preferred embodiment shown in FIG. 1, the bracing function is fulfilled by bracing members 16. As shown, the bracing members are integral with the floor of each compartment, and are of rectilinear design. It will be understood, however, that appropriate bracing could take many other forms and configurations without departing from the scope and spirit of the invention. For example, bracing could be provided by a separately made structure inserted into either or both compartments, or even by a structure external to the compartments. Design and application of appropriate bracing is considered to be within the skill of the art and is not critical to the invention.

Located at approximately the center of the first compartment is the gripping portion, comprising flexible gripping members 5, shown arrayed in three groups of three members 5 each. In use, a disk will be pressed onto members 5, which will project through the center hole of the disk and thereby retain the disk. In order to balance the gripping forces exerted by members 5, they are preferably disposed uniformly within the gripping portion, which is, of course, in the circular shape of the center hole of a disk. Accordingly, the gripping members are approximately 120 degrees apart. Described in another way, the groups of gripping members are disposed approximately 120 degrees from each other. Although three gripping members 5 are shown in each group, it will be apparent to those skilled in the art that each "group" could comprise as few as one such member, or more than three, if desired. Indeed, a multiplicity of gripping members could be uniformly arrayed around the entire circumference of the gripping portion corresponding to the center hole, as is the case in the well-known "jewel box" commonly used for the packaging of compact disks.

As indicated, the function of the gripping members is to receive and retain a disk by gripping the periphery of its center hole. While various designs are available for flexible gripping members (e.g., the "fingers" of the "jewel box," in which the fingers "point" toward the center of the center hole), it is preferred for purposes of the instant invention that gripping members 5 be of the general design and configuration shown in FIG. 3. Referring to FIG. 3, which shows an individual member 5 in profile, it will be seen that the member has a small, angled, generally triangular projection 17 over which the periphery of the center hole of a disk must pass in order to be retained by member 5. The extremities of each projection 17, if connected by an imaginary line, would form a circle which is slightly greater in diameter than the diameter of the center hole, so as to retainingly engage the circumference, i.e., the periphery, of the center hole; accordingly, it is necessary that each member 5 be sufficiently flexible in construction to bend slightly to permit passage of the center hole of the disk. In order to facilitate such passage, the top portion of each member 5 is angled, as shown by angle 22. While the precise size of angle 22 is not considered narrowly critical, it is preferred that such angle be approximately 20-40 degrees, most preferably about 30 degrees. Portion 18 of member 5 is the surface which bears against the circumference of the center hole when the disk is grippingly engaged. In order to enhance the gripping engagement, it is desirable that members 5 be biased slightly outwardly, i.e., toward the circumference of the center hole, so as to provide outward radial pressure against that circumference. This may be simply accomplished by, e.g., locating and dimensioning the bases of members 5 at a slightly greater diameter than the diameter of the center hole. Other means of accomplishing such biasing will be apparent to those skilled in the art.

While members 5 are preferably finger-like structures, as shown, it will be appreciated that other types of structures may also be successfully employed. For purposes of illustration, members 5 could take the form of wall-like structures, curved to fit the curvature of a center hole of a disk, as illustrated in FIG. 6, provided only that they have the necessary flexibility and ability to retain a disk, as described above.

Although members 5 are shown as integral with the floor of their respective compartments, it is apparent that they could also be advantageously provided by means of a separately manufactured structure which could be inserted and appropriately attached to each respective floor. Such an approach might be useful if it were desirable to manufacture members 5 from a different material from the rest of the container, or if their design were such as to make integral molding impractical.

As indicated above, the invention utilizes an "inner" support portion. Referring again to FIG. 1, in the embodiment shown, the inner support portion comprises three support elements 6, arranged annularly to the gripping portion, i.e., annularly to the center hole of a disk retained by members 5. This group, or set, of elements is referred to as "inner" with respect to another set of support elements referred to as "outer," which are described below. Support elements 6 project above the floor of their respective compartment (see FIG. 3 for an elevation view) and are dimensioned to supportingly contact the lower surface of a disk when the disk is being retained by members 5. Accordingly, elements 6 are of appropriate height to hold a disk clear of the bottom of the compartment and any bracing, and just high enough to permit the upper surface of the disk to rest beneath the lower angled surface of projection 17. It will be observed from FIG. 1 that each element 6 is located radially outwardly from each corresponding group of members 5. While not an absolute requirement of this invention, such location is preferred since it tends to provide support for the disk near where countervailing pressure may be exerted by projection 17, thereby minimizing the effect of any warping forces which may exist. In order to avoid imparting any damage to information which may be recorded on the lower surface of the disk, support elements 6 are located so as to contact the disk in its so-called "label area," that is, the annular area surrounding the center hole which is usually covered by a paper label. Elements 6 may also be located so as to contact the disk in the blank area beyond the label area but before the area in which recorded information begins. It will be understood that, although fewer than or more than three elements 6 may be used in a compartment, it is preferable to use at least three in order to balance the support points for the disk being supported. In any case where two or more elements 6 are used, they should be uniformly distributed around the circumference of an imaginery circle formed by connecting them. As depicted in FIG. 1, elements 6 are shown as having a "T" cross-section. Such a shape provides structural strength with minimal use of materials, but is only one of many shapes which could be successfully used. For example, square, rectangular, or circular cross-section elements would also function for the purpose of providing support. One of the elements 6 in FIG. 1 is shown as integral with a bracing member 16, but such location is merely an arbitrary aspect of the bracing configuration shown, and is not a requirement of the invention. It will also be appreciated that elements 6 could also comprise a unitary, circular structure, such as shown in FIG. 6, or could comprise a platform (not shown) as in the "jewel box." It is preferred, however, that elements 6 be as small as reasonably practicable, in order to conserve material.

As indicated above, the instant invention also includes an "outer" support portion. In FIG. 1, this is illustrated as a set of at least three support elements 7, raised with respect to the floor of their respective compartments, the function of which is to supportingly contact the lower surface of a disk retained by flexible members 5, but at or near the outer extremity of the disk, in order to provide support to the outer reaches of the disk, where the possibility of warpage is greatest. Accordingly, elements 7 are located circumferentially with respect to a retained disk so as to contact the disk in the narrow annular area between the outer extremity of the disk and the outer extremity of the recorded area. As shown in a preferred embodiment in FIG. 1, elements 7 comprise the short legs of a unitary structure which is "C"-shaped in cross-section, although it will be understood that numerous other configurations could be substituted. The "C" configuration has been chosen for this embodiment so as to incorporate, for purposes of convenience, positioning elements 8 and projecting element 9, both of which will be described further below. As with inner support elements 6, the height of elements 7 is great enough to support the disk clear of the cross-bracing and essentially at the same height as elements 6, in order to keep the disk at essentially the same level above the floor throughout the containment space. While not an absolute requirement of the instant invention, if three elements 7 are used, it is preferred that they be uniformly distributed around the circumference of an imaginary circle drawn through them, and also that they be located approximately on an imaginary radial line drawn to bisect an imaginary line drawn between neighboring elements 6. By such a location, support is distributed over the disk in a more nearly uniform manner. Obviously, if more than three elements 7, and/or more than three elements 6, are employed, the specific location of individual elements becomes less significant in providing the most uniform support possible. It will, of course, be understood that, as with elements 6, elements 7 may take any suitable form. For example, they may comprise a unitary, circular form located near the circumference of the disk, or they may comprise segments of such a circular form, as suggested in FIG. 6.

According to the preferred embodiment shown in FIG. 1, two of the C-shaped structures including elements 7 also include positioning element 8, and one C-shaped structure includes projecting element 9 (described below), which also does double duty as a positioning element in this design. (The combining of elements has been done as a matter of manufacturing convenience, and is not considered to be a requirement of the invention.) The principal purpose of a positioning element 8 is to help guide the disk onto flexible gripping members 5. Accordingly, a positioning element needs to project above the floor of its respective compartment by at least a sufficient height to extend above the lower surface of the disk it seeks to position when that surface is in contact with the nearest support element 7, thereby cooperating with the gripping portion to position the disk within the containment area. In order to facilitate positioning regardless of the direction from which the disk is being inserted, it is preferred that there be more than one positioning element; thus, FIG. 1 shows three (one of which is projecting element 9) positioning elements 8 in each compartment. When the disk is seated on support elements 6 and 7 and retained by members 5, positioning elements 8 will be located slightly beyond the circumference of the disk so as to slightly clear its periphery. While the amount of clearance is not considered narrowly critical, it is preferred that the clearance be kept to a minimum in order to provide a satisfactory degree of positioning effect, and also to provide a useful degree of restraint against lateral shifting of the disk if it is subjected to external forces, thereby minimizing the lateral stress applied to flexible members 5. It will be appreciated that there is considerable freedom of choice in the design and location of positioning elements 8. For example, reference may be had to FIG. 6 for some other possible alternatives.

The height relationships among elements 6, 7, and 8, and bracing member 16 may be more readily understood by reference to FIG. 2, which shows them in elevation view.

As used herein, the terms "radial," "radially," and "diametrically" refer to imaginary lines drawn radially or diametrically, as the case may be, through the center of the center hole area of a disk, i.e., through the center of the gripping portion of a compartment.

A key requirement of a preferred embodiment the instant invention is the presence of projecting element 9 (which, in the design depicted, is conveniently formed integrally with a C-shaped structure also including support elements 7). Projecting element 9 projects above the floor of its compartment sufficiently to extend into a second, opposing compartment and preferably contact the upper surface of a second disk contained in the second compartment when the container is fully closed. In this embodiment of the invention, it is particularly preferred that an element 9 of one compartment be located generally opposite, more preferably diametrically opposite, an element 9 of the opposing compartment. Since element 9 must not come in contact with the material recorded on the other disk, element 9 must contact the other disk between the outer extremity of its recorded area and the periphery of the disk. Element 9 should not apply any significant bending force to the other disk; accordingly, element 9 should be dimensioned so as to contact only lightly the other disk. In another embodiment, element 9 is of length dimensioned to be slightly above the upper surface of said second disk when the container is fully closed and in the absence of external forces, but of sufficient length to contact said surface in the presence of at least light external force having a component normal to said surface, i.e., a compressive force. In either embodiment, once contact is made with the opposing disk surface, the effect is to provide a mutually supporting vertical relationship between the two disks and to provide mutual support between the first and second compartments when the two compartments are closed onto each other and their corresponding walls are engaged, whereby the rigidity and resistance to compressive force of the entire container is increased. It will be apparent that the precise length of element 9 (i.e., the height of element 9 above its compartment floor) is a matter of choice, depending upon which embodiment is desired, and also upon the closed dimensions of the container. It will also be apparent that elements 9 should be of such design and structure that they are sufficiently sturdy to withstand at least modest compressive forces exerted upon the container, and thereby perform their principal function of preventing collapse of the container and injury to the disks.

Turning now to the opposing compartment 11 shown in FIG. 1b, it will be clear that this compartment also has a floor 12, as well as all the other parts described in detail above with respect to the first compartment; therefore, there is no need to describe them again. The second compartment differs from the first compartment, however, in a crucial detail: the gripping portion is offset (see 13) in the plane of the floor from the gripping portion of the first compartment. The purpose of offset 13 is to provide clearance so that projecting element 9 of each compartment can contact the disk in the opposing compartment The precise size of offset 13 will be a matter of design choice, depending upon the chosen shape of element 9 (e.g., a straight, rectilinear shape, as shown, or a circular or eliptical or other cross-section). The controlling factor, however, is that the offset must be dimensioned such that element 9 will not contact the opposing disk in an area containing recorded information.

While FIG. 1 shows offset 13 in relation to the longitudinal center lines of the two compartments, it will be understood that the offset need not be so. For example, the offset can appropriately be in any direction along the plane of the floor, provided that the positions of the other component parts of the compartment are adjusted accordingly.

It should also be noted from FIG. 1 that the positions of the groups of gripping members 5, comprising the gripping portion, in compartment 11 have been rotated with respect to the positions of the groups of gripping members in compartment I. The purpose of the rotation is to assure that the ends of the gripping members in the two compartments will not contact each other when and if the container in the closed position is subjected to external compressive force. If the ends of the opposing gripping members were to be compressed against each other, there might be a release of either or both of the disks being retained by the respective gripping members. While the rotation shown in FIG. 1b is about 60 degrees relative to that shown in FIG. 1a, it will be understood that the precise amount of rotation is not narrowly critical, provided only that it be sufficient to produce the desired clearance between opposing gripping members or groups thereof.

While not an absolute requirement of the invention, it is highly desirable that the corresponding walls of the opposing compartments engage each other structurally when the container is fully closed. In this way, the overall strength and rigidity of the container is enhanced, and a better seal against, e.g., dust and moisture, is obtained. Referring to FIG. 4, wall engagement may be accomplished by use of lip 19, which fits snuggly into a mating grove or stepped profile (neither shown) in the corresponding wall of the opposite compartment when the container is in the fully closed position. Alignment of the walls during closure is facilitated by the presence of guide projections 14 which fit into corresponding indentations 15 (see FIG. 1) in the corresponding wall of the opposite compartment. These features are also depicted in FIG. 5, which additionally shows a small reveal 21, as typical in a well-designed, molded container.

In another embodiment of the invention, the disks in the opposing compartments are not necessarily offset. In this embodiment, at least one, preferably multiple, projecting elements 9 are dimensioned of appropriate height above the floor of their respective compartment as to contact a corresponding projecting member in the opposite compartment when the container is fully closed. As will be appreciated, it is not necessary in this embodiment that either projecting element 9 be long enough to project into the opposite compartment; they could, for example, be of equal length and contact each other in the area of reveal 21. Alternatively, either element 9 could be made long enough to project into the opposite compartment and there contact its corresponding member. As previously described, a projecting element 9 may also be designed integrally with a positioning element 8, in which case a projecting and/or positioning element would contact a corresponding projecting and/or positioning element, as the case may be. In still another variation, either element 9 could be made long enough to contact the floor of the opposing compartment when the container is fully closed. Optionally, in any of these embodiments, the elements 9 of the opposing compartments may be dimensioned so as to not quite touch each other (or the floor of the opposing compartment, as the case may be) when the container is fully closed, but of sufficient length to contact each other (or the floor) under the influence of external force having a compressive component. By use of any of these embodiments, a significant improvement in resistance to compressive force will be realized in relation to a container not so equipped. As will be readily appreciated, in this embodiment, an offset also may be used, if desired, and the advantages of the disk-contacting feature of elements 9, as described for the first embodiment, may simultaneously be obtained.

FIGS. 7a and 7b show two possible embodiments of still another embodiment of the invention, wherein each compartment may further comprise one or more post elements 23 projecting above the floor 2 (or 12) of its respective compartment, each such post element being dimensioned and adapted to grippingly engage a corresponding post element in the opposing compartment when the container is in the fully closed position, but also adapted to readily release engagement when the container is manually opened. Each post element 23 comprises an engaging portion 24 designed to matingly and grippingly engage the mating engaging portion of the opposing post element. In FIG. 7a is depicted a ball-in-socket type of engagement, whereas FIG. 7b depicts a simple interference fit type of engagement. It will be apparent that various other forms of engagement could also be used without departing from the spirit and scope of the invention. The principal consideration in the design of the mating portion of the post elements is that it be readily engaged by modest compressive force applied to the outside of either or both compartments, and that it also be readily disengaged by the act of opening the container. The "female" post element of each mating pair preferably is constructed to have a seating surface 25 upon which the "male" portion of the corresponding post element seats when the container is fully closed. This feature provides significant resistance to compressive forces and also helps retain the dimensional stability of the closed container. While such post elements could be located anywhere not occupied by the disks, it is preferable that each member of one such pair of mating post elements be located within the center hole area of its respective commpartment. In addition to the advantages just mentioned, such central location also serves to retain the disks within the container if, for instance, the container is subjected to shock severe enough to cause the latching members to release, or if the disks were not properly inserted onto the gripping portions.

As has been mentioned, gripping members 5 can take various forms, including such forms as would provide a primarily friction fit against the periphery of the center hole in lieu of a shaped disk-retaining means such as projection 17. Thus, in one embodiment, one or more members 5 could be absent projection 17, and could be positioned and dimensioned, and stiffened, if desired, so as to bear, via surface 18, relatively more firmly against said periphery than might be the case with a design of members 5 which makes them sufficiently flexible to permit passage of said periphery over projection 17. The desired degree of stiffening can be obtained by such means as increasing the thickness of member 5, adding a bracing element (e.g., of triangular shape) (not shown) to the back side of member 5 (i.e., the side opposite surface 18), and the like. In a particularly preferred embodiment of the invention, referring to the groups (or sets) of members 5 depicted in FIG. 1, one or more members of each set could be of the friction-fit type, as just described. Where members 5 are arranged in groups of three, it is especially useful for the middle member of each set to be of the friction-fit type. Alternatively, if a still tighter fit is desired, the first and third members of each group of three could be of the friction-fit type, and the middle member being of the type having a shaped, disk-retaining means such as projection 17.

As indicated previously, the device of this invention is preferably molded in one piece from a thermoplastic resin, preferably polypropylene. While the selection of the specific resin or blend of resins is considered to be within the skill of the art, it will be apparent to those reasonably skilled in the art that the appropriate resin(s) will have a high level of flexibility, impact strength, and dimensional stability, and at least a moderately high level of surface hardness and gloss, and will have appropriate flow characteristics for the mold design employed. The preferred resin for the embodiments depicted in the figures herein is a general-purpose polypropylene resin sold under the trade name Pro-Fax 6331NW by Himont U.S.A., Inc., Wilmington, Del. This material is stated by its manufacturer to have a melt flow rate of 12 decigrams/minute, a density of 0.904 gram/cubic centimeter, a tensile strength of 5,400 pounds/square inch, an elongation of 9.5%, a flexural modulus of 275,000 pounds/square inch, and a Rockwell hardness (R scale) of 105.

It will be readily recognized by those skilled in the art that numerous variations to the embodiments described above may be made without departing from the scope and spirit of the invention. Decorative and/or additional structural features may be included, as desired. For example, a decorative cover, or a protective sleeve, or an informational insert may be provided for, as by addition of an external compartment, sleeve or slipcase.

While the invention has been described with reference to two compartments, it will be understood that one or more additional compartments may also be included by hinging to either of the existing compartments, provided, of course, that the structural relationships described herein are maintained in each pair of opposing compartments.

We claim:

1. A multi-compartment, closable container for the storage, display and transport of one or more disks which have information recorded thereon, said disks having a center hole, and an upper surface upon which the information is recorded, and a lower surface upon which information is optionally recorded, said container comprising at least a first compartment for containing a first said disk and a second compartment of matching size and shape for containing a second said disk, both compartments comprising walls and a floor, said first compartment being hingedly connected to said second compartment and being of size and shape at least sufficient to contain said first disk, said first compartment comprising:

(a) a floor section having walls projecting thereabove and defining a containment space for said first disk, one of said walls having one or more hinge members being connected to a corresponding wall of said second compartment, said walls being adapted to matingly engage the corresponding walls of said second compartment, (b) at least one latching member located on one or more walls other than the wall having said hinge member, each such latching member being adapted to latchingly engage a mating latching member on a corresponding portion of said second compartment, (c) a gripping portion within said containment space for gripping said first disk and comprising at least two flexible gripping members rising from said floor and spaced generally uniformly around the circumference of an imaginary circle connecting them for grippingly engaging the periphery of the said center hole of said first disk, (d) an inner support portion for supporting said first disk comprising at least one support element raised with respect to said floor and arranged annularly and outwardly with respect to the gripping portion for supportingly contacting the lower surface of said first disk, (e) an outer support portion for further supporting the lower surface of said first disk and comprising at least one support element raised with respect to said floor and arranged annularly and outwardly with respect to said inner support portion, (f) at least one positioning element for positioning said first disk and raised with respect to said floor and arranged annularly and outwardly with respect to said outer support portion, (g) at least one projecting element raised with respect to said floor and located beyond the periphery of said outer support portion and of sufficient height to project into said second compartment for contacting said second disk when the container is closed, said second compartment comprising:

(h) a floor section having walls projecting thereabove and defining a containment space for said second disk, said walls being adapted to matingly engage the corresponding walls of said first compartment, (i) at least one latching member located on one or more walls other than the wall having said hinge member, each such latching member being adapted to latchingly engage a mating latching member on a corresponding portion of said first compartment, (j) a gripping portion within said containment space for gripping said second disk and comprising at least two flexible gripping members rising from said floor and spaced generally uniformly around the circumference of an imaginary circle connecting them for grippingly engaging the periphery of the said center hole of said second disk, said gripping portion being offset from the gripping portion of said first compartment, (k) an inner support portion for supporting said second disk and comprising at least one support element raised with respect to said floor and arranged annularly and outwardly with respect to the gripping portion for supportingly contacting the lower surface of said second disk, (l) an outer support portion for further supporting the lower surface of said second disk and comprising at least one support element raised with respect to said floor and arranged annularly and outwardly with respect to said inner support portion, (m) at least one positioning element for positioning said second disk and raised with respect to said floor and arranged annularly and outwardly with respect to said outer support portion, (n) at least one projecting element raised with respect to said floor and located beyond the periphery of said outer support portion and of sufficient height to project into said first compartment for contacting said first disk when the container is closed, thereby providing a mutually supporting vertical relationship between the two disks and providing mutual support between the first and second compartments when the two compartments are closed onto each other and their corresponding walls are engaged, whereby the rigidity and resistance to compression of the entire container are increased.

2. A container of claim 1 wherein the positioning elements are integral with the outer support elements.

3. A container of claim 1 wherein a projecting element is integral with an outer support element.

4. A container of claim 3 wherein a projecting element is also a positioning element.

5. A container of claim 1 wherein the gripping portion comprises a wall-like structure, or groups of flexible gripping members arranged uniformly around the circumference of an imaginary circle connecting them.

6. A container of claim 1 wherein the flexible gripping members are finger-like and have an angled projection to retain the periphery of the center hole of a disk thereunder.

7. A container of claim 1 wherein the flexible gripping members are outwardly biased so as to press against the periphery of the center hole of a disk retained thereby.

8. A container of claim 1 wherein multiple latching members are arrayed along one wall.

9. A container of claim 8 wherein said latching members are arrayed along the wall opposite the wall having the hinge member.

10. A container of claim 1 comprising a set of at least three inner support members wherein at least one inner support member is located radially outwardly of a flexible gripping member or set of flexible gripping members.

11. A container of claim 1 comprising a set of at least three inner support members wherein at least one outer support member is located on a radial line which approximately bisects the angle which the two nearest inner support members form with the center of the center hole.

12. A container of claim 1 wherein a projecting element of one compartment is located generally opposite a projecting element of an opposing compartment.

13. A container of claim 1 which further comprises at least one projecting element which contacts a corresponding projecting element in the opposing compartment when the container is in the fully closed position.

14. A container of claim 13 in which a projecting element is also a positioning element.

15. A container of claim 1 which further comprises at least one projecting element which contacts the floor of the opposing compartment when the container is in the fully closed position.

16. A container of claim 1 wherein each compartment further comprises a post element, raised with respect to the floor of its respective compartment and located within the gripping portion of its respective compartment, wherein each post element is dimensioned and adapted to grippingly engage the corresponding post element in the opposing compartment when the container is in the fully closed position, and to readily release engagement when the container is manually opened.

17. A multi-compartment, closable container for the storage, display and transport of one or more disks which have information recorded thereon, said disks having a center hole, and an upper surface upon which the information is recorded, and a lower surface upon which information is optionally recorded, said container comprising at least a first compartment for containing a first said disk and a second compartment of matching size and shape for containing a second said disk, both compartments comprising walls and a floor, said first compartment being hingedly connected to said second compartment and being of size and shape at least sufficient to contain said first disk, said first compartment comprising:

(a) a floor section having walls projecting thereabove and defining a containment space for said first disk, one of said walls having one or more hinge members being connected to a corresponding wall of said second compartment, said walls being adapted to matingly engage the corresponding walls of said second compartment, (b) at least one latching member located on one or more walls other than the wall having said hinge member, each such latching member being adapted to latchingly engage a mating latching member on a corresponding portion of said second compartment, (c) a gripping portion within said containment space for gripping said first disk and comprising at least two flexible gripping members rising from said floor and spaced generally uniformly around the circumference of an imaginary circle connecting them for grippingly engaging the periphery of the said center hole of said first disk, (d) an inner support portion for supporting said first disk and comprising at least one support element raised with respect to said floor and arranged annularly and outwardly with respect to the gripping portion for supportingly contacting the lower surface of said first disk, (e) an outer support portion for further supporting the lower surface of said first disk and comprising at least one support element raised with respect to said floor and arranged annularly and outwardly with respect to said inner support portion, (f) at least one positioning element for positioning said second disk and raised with respect to said floor and arranged annularly and outwardly with respect to said outer support portion, (g) at least one projecting element raised with respect to said floor and located beyond the periphery of said outer support portion and of sufficient height to project into said second compartment for contacting, a corresponding projecting element or positioning element or the floor in said second compartment when the container is closed, said second compartment comprising:

(h) a floor section having walls projecting thereabove and defining a containment space for said second disk, said walls being adapted to matingly engage the corresponding walls of said first compartment, (i) at leas one latching member located on one or more walls other than the wall having said hinge member, each such latching member being adapted to latchingly engage a mating latching member on a corresponding portion of said first compartment, (j) a gripping portion within said containment space for gripping said second disk and comprising at least two flexible gripping members rising from said floor and spaced generally uniformly around the circumference of an imaginary circle connecting them for grippingly engaging the periphery of the said center hole of said second disk, (k) an inner support portion for supporting said second disk and comprising at least one support element raised with respect to said floor and arranged annularly and outwardly with respect to the gripping portion for supportingly contacting the lower surface of said second disk, (l) an outer support portion for further supporting the lower surface of said second disk and comprising at least one support element raised with respect to said floor and arranged annularly and outwardly with respect to said inner support portion, (m) at least one positioning element for positioning said second disk and raised with respect to said floor and arranged annularly and outwardly with respect to said outer support portion, (n) at least one projecting element raised with respect to said floor and located beyond the periphery of said outer support portion and of sufficient height to project into said first compartment for contacting a corresponding element or positioning element or the floor in said first compartment when the container is closed, thereby providing mutual support between the first and second compartments when the two compartments are closed onto each other and their corresponding walls are engaged, whereby the rigidity and resistance to compression of the entire container are increased.

18. A container of claim 17 wherein the positioning elements are integral with the outer support elements.

19. A container of claim 17 wherein a projecting element is integral with an outer support element.

20. A container of claim 19 wherein a projecting element is also a positioning element.

21. A container of claim 17 wherein the gripping portion comprises a wall-like structure, or groups of flexible gripping members arranged uniformly around the circumference of an imaginary circle connecting them.

22. A container of claim 17 wherein the flexible gripping members are finger-like and have an angled projection to retain the periphery of the center hole of a disk thereunder.

23. A container of claim 17 wherein the flexible gripping members are outwardly biased so as to press against the periphery of the center hole of a disk retained thereby.

24. A container of claim 17 wherein multiple latching members are arrayed along one wall.

25. A container of claim 24 wherein said latching members are arrayed along the wall opposite the wall having the hinge member.

26. A container of claim 17 comprising a set of at least three inner support members wherein at least one inner support member is located radially outwardly of a flexible gripping member or set of flexible gripping members.

27. A container of claim 17 comprising a set of at least three inner support members wherein at least one outer support member is located on a radial line which approximately bisects the angle which the two nearest inner support members form with the center of the center hole.

28. A container of claim 17 in which a projecting element is also a positioning element.

29. A container of claim 17 wherein each compartment further comprises a post element, raised with respect to the floor of its respective compartment and located within the gripping portion of its respective compartment, wherein each post element is dimensioned and adapted to grippingly engage the corresponding post element in the opposing compartment when the container is in the fully closed position, and to readily release engagement when the container is manually opened.

* * * * *